INVENTORS
GEORGE M. WILFLEY &
JAMES B. STUDEBAKER
BY
Shoemaker and Mattare
ATTORNEYS

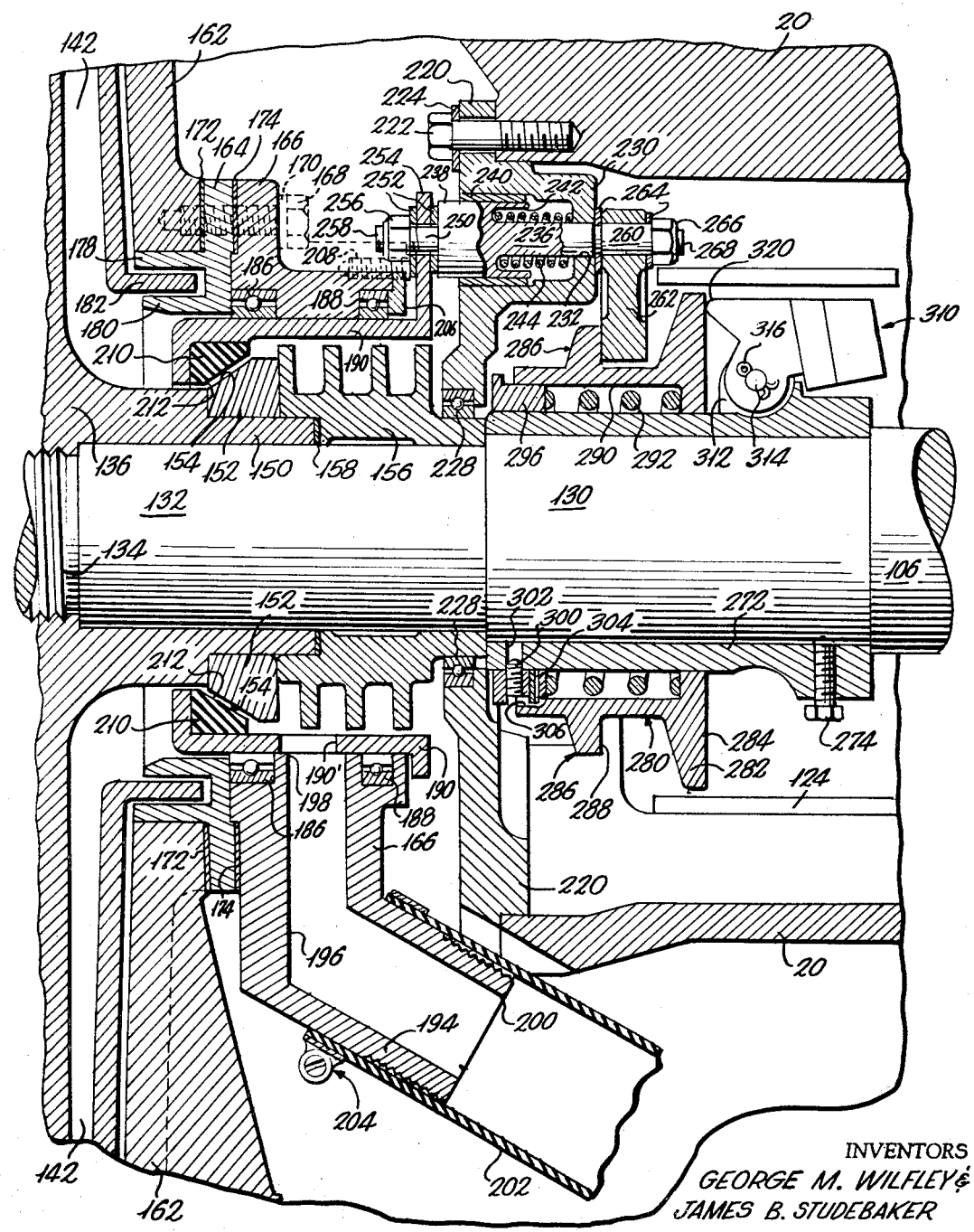

United States Patent Office 3,402,671
Patented Sept. 24, 1968

3,402,671
CENTRIFUGAL PUMP AND SEALING
MEANS THEREFOR
George M. Wilfley, Denver, and James B. Studebaker,
Littleton, Colo., assignors to A. R. Wilfley and Sons,
Inc., Denver, Colo.
Filed May 17, 1967, Ser. No. 639,078
9 Claims. (Cl. 103—111)

ABSTRACT OF THE DISCLOSURE

A centrifugal pump includes a rotatable shaft having an impeller secured thereto, the impeller including both pumping vanes and auxiliary expeller vanes. Exhaust means is provided for exhausting liquid from the pump, and sealing means is positioned intermediate the impeller and the exhaust means. The sealing means includes a first portion supported on the shaft and axially fixed relative to the pump; and a second sealing portion engageable with the first sealing portion is supported by a retainer means and is axially movable relative to the pump. The two sealing portions have sealing surfaces extending obliquely to the longitudinal axis of the shaft, and supplementary sealing means engages the retainer means to provide a seal therewith. The operating means for moving the second sealing portion includes push rod means connected with the retainer means. First spring means engages a portion of the push rod means for urging the second sealing portion away from the first sealing portion. A yoke means is connected with the push rod means. A spider is fixedly secured to the shaft, and an actuator body is slidably mounted on the spider. This actuator body engages the yoke means. A second spring means engages the actuator body and is stronger than the first spring means to normally urge the actuator body, the yoke means and the associated components to move the second sealing portion toward the first sealing portion. Speed responsive weights are pivotally mounted on the spider means and are engageable with the actuator body to move it in a direction to overcome the force of the second spring means to allow the first spring means to disengage the second sealing portion from the first sealing portion.

Background of the invention

The present invention relates to a centrifugal pump including means for producing a hydraulic seal when the pump is operating, and further means is provided for producing a mechanical seal when the pump is at rest.

United States Patent No. 2,571,802 discloses an earlier development wherein the entire shaft and impeller of the centrifugal pump is shifted in order to disengage mechanical sealing surfaces. In many instances, it is not advisable to shift the entire shaft as in this prior art arrangement, and accordingly, it is necessary to provide a different type of arrangement.

A more recent development is illustrated for example in U.S. Patent 3,137,237 wherein the shaft is axially fixed with respect to the pump, and a nonrotating sealing member is shifted axially when the pump is operating to disengage the mechanical seal and to allow the hydraulic seal to perform the sealing function.

This latter type of prior art arrangement employs a bellows-like sealing means which may be subject to failure upon repeated cycling thereof.

Summary of the invention

In the arrangement of the present invention, the movable sealing portion of the sealing means is supported by a retainer means which is axially reciprocable within the pump housing. Supplementary sealing means engages this retainer means for maintaining a seal therewith during reciprocation thereof. A very rugged and reliable arrangement is provided which completely eliminates the necessity of providing a bellows-like arrangement as discussed hereinabove.

Unique operating means is employed in the present invention wherein spring means is employed both for engaging the two sealing portions and disengaging the two sealing portions with respect to one another. First spring means is provided for disengaging the sealing portions, and second spring means is provided for engaging the sealing portions. This second spring means is stronger than the first spring means so that the sealing portions are normally biased into engaging relationship.

Speed responsive means is provided for overcoming the force of the second spring means at a predetermined speed of rotation of the pump whereupon the first spring means is operative to disengage the sealing portions of the sealing means.

An object of the present invention is to provide a new and novel centrifugal pump including sealing means having a movable sealing portion, and wherein a unique, rugged and reliable operating mechanism is provided for shifting the movable sealing portion axially relative to the pump upon predetermined operating conditions of the pump.

Brief description of the drawings

FIG. 2 is an enlarged view of a portion of the structure illustrated in FIG. 1.

Description of the preferred embodiment

Figure 1:
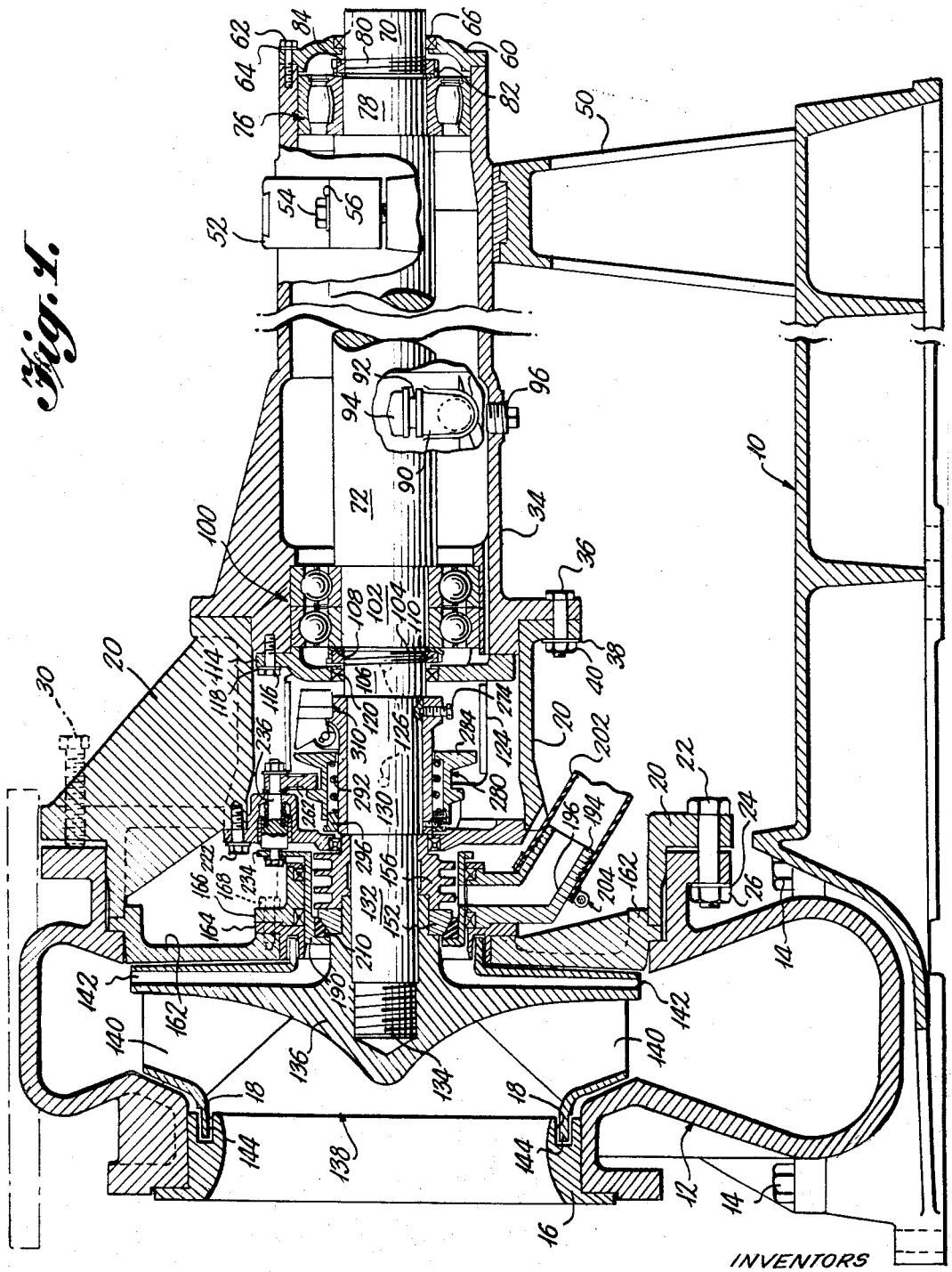
FIG. 1 is a longitudinal section, partly broken away, through a centrifugal pump according to the present invention.

Referring now to the drawings wherein like reference characters designate corresponding parts in the two views, and as seen most clearly in FIG. 1, the pump according to the present invention includes a base means 10, and a case 12 is secured to the base means by a plurality of cap screws 14. A case wear ring 16 is supported by the case and has an annular recess 18 formed therein for a purpose hereinafter described.

A case bracket 20 is secured to case 12 by means of a plurality of case bolts 22 extending through aligned holes provided in flanges formed on members 12 and 20, a washer 24 and a nut 26 being mounted on each of bolts 22 to hold them in operative position.

Screw means 30 as seen in the upper part of FIG. 1 may be threaded through suitable threaded holes provided in the case bracket 20, screw means 30 being engageable with a portion of the case 12 for accurately adjusting the clearance of the case and the case bracket with respect to one another.

The case bracket is also secured to an elongated generally cylindrical portion 34 by means of a plurality of bolts 36 extending through suitable aligned holes provided in flanges formed on the case bracket and the generally cylindrical portion. A washer 38 and a nut 40 are mounted on each of bolts 36 for retaining them in operative position as illustrated.

As seen in the right-hand portion of FIG. 1, the base means 10 includes an upstanding portion 50 which in turn supports a pedestal cap 52, cap screw means 54 being operatively connected with the pedestal cap 52 and engaging washer means 56 for retaining the pedestal cap in operative position, components 50–56 inclusive serving to support and hold the right-hand end of the generally cylindrical portion 34 in the operative position illustrated.

An end cap 60 is secured to the outer end of generally cylindrical portion 34 by means of a plurality of cap screws 62 extending through suitable holes provided in the end cap and being threaded into aligned holes provided in the end of portion 34. An oil seal 66 is supported by the inner portion of end cap 60 and is in tight sealing engagement with the outer surface of a reduced end portion 70 of an elongated shaft 72.

A rear bearing 76 supported within portion 34 also supports a portion 78 of the elongated shaft to thereby rotatably journal one end of the shaft within portion 34.

The portion 70 of the shaft is provided with an external threaded portion 80, and a lock washer 82 and lock nut 84 are provided, the lock nut being threaded on portion 80 for holding the rear bearing 76 in the operative position illustrated.

An oil filler means 90 is provided at an intermediate point on portion 34, oil filler means 90 being provided with a nipple 92 having a cap 94 mounted thereon. A plug means 96 is threaded within a suitable drain hole provided in the lower part of portion 34.

A front bearing means 100 is supported between generally cylindrical portion 34 and a reduced portion 102 of the shaft and serves to rotatably journal this portion of the shaft.

A thread 104 is formed on a reduced portion 106 of the shaft, and a lock washer 108 and a lock nut 110 are provided, the lock nut 110 being threaded onto the threaded portion 104 as illustrated for maintaining the bearing means 100 in the operative position illustrated.

A front bearing cap 114 is secured to the forward end of portion 34 by a plurality of cap screws 116 which extend through suitable holes provided in bearing cap 114 and are threaded within aligned holes provided in portion 34. A washer 118 is operatively associated with each of the cap screws 116. It will be noted that front bearing cap 114 also assists in holding the front bearing means 100 in position. An oil seal 120 is supported by the radially inner portion of front bearing cap 114 and is in sealing engagement with the outer surface of portion 106 of the shaft.

A case bracket cover 124 is provided and is held in operative position by cap screw and lock washer assemblies 126.

The shaft includes a further reduced portion 130 which in turn joins with a reduced portion 132. Portion 132 terminates in a still further reduced portion 134 having external threads thereon. The threads 134 are threaded into a suitable threaded socket provided in the hub portion 136 of an impeller indicated generally by reference numeral 138 and being of relatively conventional construction. The impeller includes pumping vanes 140 and auxiliary expeller vanes 142. The impeller also includes an annular flange portion 144 which fits within the recess 18 formed in the case wear ring previously described.

Referring now particularly to FIG. 2, the hub portion 136 of the impeller is stepped down to provide a reduced portion 150 upon which is mounted a first sealing portion 152 having a sloping seal surface 154 extending at an oblique angle to the longitudinal axis of the shaft upon which it is supported. This sealing portion is axially fixed with respect to the pump. A shaft sleeve 156 is supported on shaft portion 132 and is in abutting relationship with sealing portion 152. A gasket 158 is disposed between sleeve 156 and the reduced portion 150 of the hub of the impeller.

As seen most clearly in FIG. 1, a case plate 162 is rigidly secured to case bracket 20 and extends forwardly and then radially inwardly of a forward portion of the case bracket. Referring to FIG. 2, a labyrinth ring 164 and a seal ring housing 166 are supported from the inner portion of case plate 162 by a plurality of cap screws 168 each of which extends through aligned threaded holes formed in members 162, 164 and 166 for securing these members in operative position as illustrated. A lock washer 170 is operatively associated with each of the cap screws and gaskets 172 and 174 are inteposed between the members as illustrated.

The labyrinth ring 164 includes spaced axially extending portions 178 and 180 of annular configuration which receive an annular flange 182 formed on the impeller to provide a labyrinth type seal arrangement in the usual manner.

The seal ring housing 166 supports at the radially inner portion thereof a pair of spaced seals 186 and 188 adapted to engage the outer surface of a retainer means 190 to provide a seal with the retainer means upon reciprocation thereof as hereinafter described. This retainer means has a hole 190' formed therein to permit liquid which may escape past the sealing means of the pump to pass therethrough.

As seen most clearly in the lower portion of FIG. 2, the seal ring housing 166 includes an integral downwardly and angularly extending portion 194, a bore 196 being formed through the seal ring housing and opening at the upper end 198 thereof to receive liquid which passes through hole 190' in the retainer means. The lower end 200 of the bore 196 opens through the lower end of portion 194 of the seal ring housing 166 and is adapted to empty liquid passing through the bore into the interior of a drain tube 202. This drain tube 202 is supported at its upper end on the outer surface of portion 194 of the seal ring housing by a clamp mechanism indicated generally by reference numeral 204, this clamp mechanism being of a conventional construction similar to that of the usual hose clamp.

As seen most clearly in the upper portion of FIG. 2, the seal 188 is held in operative position by a seal retainer 206 which is supported in the position shown by a plurality of cap screws 208 extending through suitable holes provided in seal retainer 206 and being threaded into suitable threaded holes provided in the seal ring housing 166.

A second sealing portion 210 is supported within retainer means 190 and includes a sloping seal surface 212 complementary to seal surface 154 of the first sealing portion and also disposed at an oblique angle to the longitudinal axis of the shaft of the pump. These two seal surfaces 154 and 212 are adapted to engage one another to provide a good liquid-tight seal therebetween when in the position shown in FIG. 1 of the drawings.

The seal surfaces are illustrated separated from one another in the position shown in FIG. 2 of the drawings. The second sealing portion 210 may be formed of a suitable sealing substance such as plastic or the like, and the two sealing portions may be formed of various materials adapted to provide an effective liquid-tight seal therebetween.

A push rod housing 220 is supported on the case bracket by a plurality of cap screws 222 extending through suitable holes provided in a flange formed on the push rod housing and being threaded into suitable threaded holes provided in the case bracket. A lock washer 224 is operatively associated with each of the cap screws 222.

A seal 228 is supported at the radially inner portion of push rod housing 220 and is in engagement with the outer surface of the shaft sleeve 156 to provide a seal therewith.

The push rod housing includes three recessed boss portions 230 each of which has a hole 232 formed through a wall thereof for slidably receiving a push rod 236. These recessed bosses and push rods may be substantially angularly spaced about the shaft of the pump.

Each of the push rods 236 includes an enlarged portion 238 which is reciprocably mounted within a bushing 240 fitted within the open end of the associated boss portion. The enlarged portion 238 of each of the push rods is provided with an annular recess 242 which receives one end of a compression spring 244 the opposite end of which engages a wall of the associated boss whereby the push rod is urged to the left as seen in the drawings.

Each of the push rods includes a forwardly extending reduced portion 250 having a pair of spacer members 252 disposed thereabout and also disposed on opposite sides of an annular flange portion 254 formed integral with retainer means 190, flange portion 254 having suitable holes for receiving each of the reduced portions 250 of the push rods.

The push rods are maintained in operative relationship with respect to the portion 254 of the retainer means by nuts 256 which are threaded on the threaded end portions 258 of each of the push rods whereby the push rods and the retainer means along with the associated sealing portion move in unison with one another in an axial direction.

The opposite ends of each of the push rods include reduced end portions 260 each of which extends through a hole provided in an annular yoke means 262. Spacer members 264 are disposed about reduced end portions 260 and on opposite sides of the yoke means. A nut 266 is threaded on the threaded end portion 268 of each of the push rods to hold the push rods and the yoke means in assembled relationship so that they move in unison with one another in an axial direction.

A spider means 272 is disposed in surrounding relationship to portion 130 of the shaft and is held in assembled relationship therewith by means of a locking screw 274 which is threaded within a suitable threaded opening provided in the spider means and extends into an indentation formed in the outer surface of portion 130 of the shaft.

An actuator body indicated generally by reference numeral 280 is slidably positioned on the outer surface of spider means 272. Body 280 includes an annular radially outwardly extending portion 282 having a surface 284 adapted to be engaged by the weight means hereinafter described. The actuator body also includes an annular radially outwardly directed portion 286 having a surface 288 adapted to engage the yoke means for causing axial shifting of the yoke means upon axial movement of the actuator body as hereinafter described.

The actuator body is cut away as indicated at 290 to receive a compression spring 292 one end of which engages the actuator body and the other end of which engages a retainer ring 296 held in operative position by a plurality of locking screws 300 which may be three in number and equally angularly spaced about the pump shaft, these screws each being threaded within a suitable threaded hole provided in the retainer ring and extending into an aligned hole 302 provided in the spider means.

A torque pin 304 is mounted within a suitable hole provided in the retainer ring and extends radially outwardly thereof and is disposed within a longitudinally extending slot 306 formed in actuator body 280 to permit reciprocation of body 280 with respect to the retainer ring but preventing rotation with respect thereto.

Three weight members indicated generally by reference numeral 310 are provided at substantially equally angularly spaced position about the shaft of the pump, each of these weight members being pivotally supported upon an ear 312 formed integral with the spider means and supporting a pivot pin 314, cotter pin means 316 being provided for holding the weight members in operative position on the pivot pins.

Each of the weight members includes a rounded engaging portion 320 adapted to engage the surface 284 of the actuator body to move the actuator body axially of the shaft at a predetermined speed of the pump.

The apparatus is illustrated in FIG. 1 with the pump at rest or when rotating at a relatively low speed so that the weight members 310 have not been moved radially outwardly by centrifugal force sufficient to move the actuator body axially of the shaft.

In this position, the axially movable sealing portion is moved to the right to engage the axially fixed sealing portion since the spring means 292 is of greater strength than the three compression springs 244 thereby causing actuator body 280 to be moved toward the right as seen in the drawings which also carries the yoke, the push rods and the retainer means to the right.

As seen in FIG. 2, the shaft has reached a predetermined speed at which the weight members 310 move outwardly under centrifugal force so that the engaging portion 320 contacts the actuator body and moves it to the left overcoming the force of spring 292.

As the actuator body 280 moves to the left, the springs 244 will urge the push rods and the associated components to the left, thereby causing sealing portion 210 to be disengaged from sealing portion 152.

Accordingly, when the pump is at rest, a mechanical seal will be provided by the sealing portions 152 and 210. On the other hand, when the pump is in operation, the sealing members 152 and 210 will be separated from one another, and a hydraulic seal formed by the auxiliary expeller vanes 142 will be formed to prevent leakage of fluid from the impeller to the exhaust means. Any small amount of fluid which does in fact leak past the sealing means will of course be passed outwardly of the pump through the drain tube.

It is apparent that when the components are in the position shown in FIG. 2, if the pump is shut off, the weight members 310 will again return to the position shown in FIG. 1, whereupon spring 292 will force the actuator body back to the right overcoming the springs 244 whereupon the sealing portions 152 and 210 will again be carried into engagement with one another to provide a mechanical seal therebetween.

As this invention may be embodied in several forms without departing from the spirit or essential characteritics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. A centrifugal pump having a casing, a rotatable shaft in said casing, an impeller secured to said shaft for rotation therewith, exhaust means for exhausting liquid from the pump, sealing means for preventing liquid flow between said shaft and said casing, said sealing means including a first portion supported on said shaft and being axially fixed with respect to said pump, said sealing means including a second portion engageable with said first portion, said second sealing portion being axially movable with respect to the pump, and operating means for moving said second sealing portion with respect to said first sealing portion, said operating means including first spring means for moving said second sealing portion away from said first sealing portion to disengage the sealing portions, second spring means stronger than said first spring means urging said second sealing portion toward said first sealing portion to engage said sealing portions, and speed responsive means secured to said shaft and operative at a predetermined speed of rotation of the shaft to overcome the force of said second spring means to allow said first spring means to disengage said sealing portions when the pump is operating.

2. Apparatus as defined in claim 1 wherein said first sealing portion has a sloping seal surface formed thereon, said second sealing portion having a complementary sloping seal surface formed thereon, each of said sloping seal surfaces extending at an oblique angle to the longitudinal axis of said rotatable shaft.

3. Apparatus as defined in claim 1 including retainer means for supporting and retaining said second sealing portion in operative position, push rod means operatively connected with said retainer means, said first spring means engaging a portion of said push rod means for urging the push rod means and the interconnected retainer means in a direction to move said second sealing portion away from said first sealing portion.

4. Apparatus as defined in claim 3 including supplementary sealing means engaging an outer portion of said retainer means to provide a seal therewith as the retainer means reciprocates during operation of the apparatus.

5. Apparatus as defined in claim 3 including yoke means operatively connected with said push rod means so that axial movement of said yoke means causes a corresponding axial movement of said push rod means.

6. Apparatus as defined in claim 5 including an actuator body, said actuator body being adapted to engage a portion of said yoke means so that axial movement of the actuator body causes axial movement of said yoke means.

7. Apparatus as defined in claim 6 including spider means fixed to said shaft, said actuator body being slidably mounted on said spider means, said actuator body being urged in one direction by said second spring means to engage said yoke means and to move the associated push rod means and retainer means to cause the second sealing portion to engage the first sealing portion.

8. Apparatus as defined in claim 7 wherein said speed responsive means is engageable with said actuator body to move the actuator body against the force of said second spring means, said speed responsive means including weight means pivotally supported upon said spider means.

9. Apparatus as defined in claim 1 wherein said first and second sealing portions are each provided with sloping seal surfaces of complementary configuration, each of said sloping seal surfaces extending at an oblique angle to the longitudinal axis of said shaft, said first and second sealing portions being disposed intermediate said impeller and said exhaust means, said second sealing portion being supported and retained in operative position by retainer means, auxiliary sealing means providing a seal with said retainer means as it reciprocates during operation of the apparatus, push rod means operatively connected with said retainer means so that the push rod means and retainer means move in unison in an axial direction relative to the pump, said first spring means engaging a portion of said push rod means, yoke means secured to said push rod means so that the yoke means and the push rod means move in unison in an axial direction relative to the pump, spider means fixed to said shaft, an actuator body slidably mounted on said spider means and including a portion engaging a part of said yoke means so that axial movement of the actuator body controls axial movement of the yoke means and the associated components, said second spring means engaging said actuator body to urge it in one direction, said speed responsive means including weight means pivotally supported by said spider means and engageable with said actuator body to move said actuator body in a direction opposite to that in which it is urged by said second spring means.

References Cited

UNITED STATES PATENTS

| | | | |
|---|---|---|---|
| 1,556,657 | 10/1925 | Wilfley | 277—25 |
| 1,976,532 | 10/1934 | Wilfley | 277—25 |
| 2,092,351 | 9/1937 | Huntzicker | 277—25 |
| 2,571,802 | 10/1951 | Wilfley et al. | 103—111 |
| 2,620,207 | 12/1952 | Wilfley | 277—25 |
| 2,660,487 | 11/1953 | Wilfley | 277—25 |

HENRY F. RADUAZO, *Primary Examiner.*